US008244749B1

(12) United States Patent
Das et al.

(10) Patent No.: US 8,244,749 B1
(45) Date of Patent: Aug. 14, 2012

(54) GENERATING SIBLING QUERY REFINEMENTS

(75) Inventors: Anwis Das, Sunnyvale, CA (US);
Abhinandan S. Das, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 12/557,425

(22) Filed: Sep. 10, 2009

Related U.S. Application Data

(60) Provisional application No. 61/184,504, filed on Jun. 5, 2009.

(51) Int. Cl.
*G06F 17/30* (2006.01)
(52) U.S. Cl. .......................................... 707/765
(58) Field of Classification Search .......... 707/765–768, 707/E17.063–E17.066
See application file for complete search history.

(56) References Cited

U.S. PATENT DOCUMENTS

| 7,870,132 | B2* | 1/2011 | Chen et al. ............ 707/736 |
| 2002/0051020 | A1* | 5/2002 | Ferrari et al. .......... 345/854 |
| 2006/0059134 | A1* | 3/2006 | Palmon et al. ............ 707/3 |

* cited by examiner

*Primary Examiner* — Thu-Nguyet Le
(74) *Attorney, Agent, or Firm* — Fish & Richardson P.C.

(57) ABSTRACT

Methods, systems, and apparatus, including computer programs encoded on computer storage media, for identifying query refinements from sibling queries. In one aspect, a method includes associating each of a plurality of parent queries with a respective group of one or more child queries for the parent query, identifying one or more candidate sibling queries for a particular child query, selecting one or more final sibling queries for the particular child query from the one or more candidate sibling queries, and associating the final sibling queries with the particular child query as query refinements.

60 Claims, 10 Drawing Sheets

GENERATING SIBLING QUERY REFINEMENTS

CROSS-REFERENCE TO RELATED APPLICATIONS

This application claims the benefit under 35 U.S.C. §119(e) of U.S. Patent Application No. 61/184,504, titled "Generating Query Refinements from User Preference Data," filed Jun. 5, 2009, which is incorporated here by reference.

BACKGROUND

This specification relates to generating query refinements.

Internet search engines provide information about Internet accessible resources (e.g., Web pages, images, text documents, multimedia content) that are responsive to a user's search query by returning a set of search results in response to the query. A search result includes, for example, a Uniform Resource Locator (URL) and a snippet of information for resources responsive to a query. However, the set of search results that are presented to a user are not always what the user is trying to find. A search engine may present query refinements (e.g., other queries related to the user's search query) to the user to help the user find desired search results.

SUMMARY

This specification describes technologies relating to generating sibling query refinements. In general, one aspect of the subject matter described in this specification can be embodied in methods that include the actions of associating each of a plurality of parent queries with a respective group of one or more child queries for the parent query, wherein each child query was submitted during a respective session following submission of its associated parent query during the session; identifying one or more candidate sibling queries for a particular child query, wherein the particular child query is a child query for one or more first parent queries in the plurality of parent queries and each candidate sibling query for the particular child query is a child query for one or more second parent queries in the plurality of queries, each first parent query and each second parent query having a fan-out measure that satisfies a fan-out threshold, wherein for each candidate sibling query, the one or more second parent queries for the candidate sibling query and the one or more first parent queries have a group of shared parent queries in common and the group of shared parent queries has a size that satisfies a common-query threshold; and selecting one or more final sibling queries for the particular child query from the one or more candidate sibling queries, and associating the final sibling queries with the particular child query as query refinements for the particular child query. Other embodiments of this aspect include corresponding systems, apparatus, and computer programs recorded on computer storage devices, each configured to perform the operations of the methods.

These and other embodiments can each optionally include one or more of the following features. Each child query can have been submitted during a respective session following submission of its associated parent query during the session without any intervening queries submitted in the session. The group of one or more final siblings can be selected according to a diversity between documents responsive to the final sibling queries. Each child query for each parent query can have been submitted within an amount of time from when the parent query is submitted that satisfies a submission threshold. For each child query, a user who submitted the child query can have selected a search result responsive to the child query after submitting the child query.

The fan out measure for a particular parent query can be the number of child queries associated with the particular parent query. Each candidate sibling query can have a fan-in measure that satisfies a fan-in threshold, wherein the fan-in measure for a particular sibling query is the number of parent queries that the particular sibling query is associated with. Each candidate sibling query for the particular child query can have a satisfactory strength of relationship to the particular child query, wherein the strength of relationship for a candidate sibling query is derived from a number of times the particular child query was submitted after each parent query in the group of shared parent queries for the particular child query was submitted and a number of times the candidate sibling query was submitted after each parent query in the group of shared parent queries for the particular child query and the candidate sibling query. A strength of relationship can be satisfactory if the strength of relationship satisfies a relationship threshold.

The common-query threshold can have a first value when the candidate sibling query is a superstring of the particular child query, and a higher second value when the candidate sibling query is not a superstring of the particular child query. Each first parent query can be a high quality parent query for the particular child query, and each second parent query for a particular candidate sibling query can be a high quality parent query for the particular sibling query. A high quality parent query can have a high inverse document frequency in a corpus of documents. A high quality parent query for a given child query can not be a superstring of the given child query.

In general, another aspect of the subject matter described in this specification can be embodied in methods that include the actions of associating each of a plurality of parent queries with a respective group of one or more child queries for the parent query, wherein each child query was submitted in a respective session following submission of its associated parent query in the session, without any intervening queries submitted in the session; identifying one or more candidate sibling queries for a particular child query, wherein the particular child query is a child query for one or more first parent queries in the plurality of parent queries and each candidate sibling query for the particular child query is a child query for one or more second parent queries in the plurality of queries, the one or more second parent queries for the candidate sibling query and the one or more first parent queries have a group of shared parent queries in common, the group of shared parent queries having a size that satisfies a common-query threshold; and selecting one or more final sibling queries for the particular child query from the one or more candidate sibling queries according to a diversity between documents responsive to the final sibling queries, and associating the final sibling queries with the particular child query as a query refinement for the particular child query. Other embodiments of this aspect include corresponding systems, apparatus, and computer programs recorded on computer storage devices, each configured to perform the operations of the methods.

These and other embodiments can each optionally include one or more of the following features. Each child query can have been submitted during a respective session following submission of its associated parent query during the session without any intervening queries submitted in the session. Each first parent query can be a high quality parent query for the particular child query, and each second parent query for a particular candidate sibling query can be a high quality parent query for the particular sibling query. Each candidate sibling query for the particular child query can have a satisfactory strength of relationship to the particular child query, wherein the strength of relationship for a candidate sibling query is derived from a number of times the particular child query was submitted after each parent query in the group of shared parent queries for the particular child query was submitted and a number of times the candidate sibling query was submitted after each parent query in the group of shared parent queries for the particular child query and the candidate sibling query. Each first parent query and each second parent query can have a fan-out measure that satisfies a fan-out threshold, where the fan out measure for a particular parent query is the number of child queries associated with the particular parent query. Each candidate sibling query can have a fan-in measure that satisfies a fan-in threshold, wherein the fan-in measure for a particular sibling query is the number of parent queries that the particular sibling query is associated with.

The candidate sibling queries can be ordered according to an order, and selecting one or more final sibling queries for the particular child query from the one or more candidate sibling queries according to a diversity between documents responsive to the final sibling queries can include processing one or more of the candidate sibling queries according to the order and determining, for at least one candidate sibling query, that the candidate sibling query has an intra-sibling diversity score satisfying a diversity threshold, the intra-sibling diversity score estimating diversity between a group of top documents responsive to the candidate sibling and a group of seen documents, and adding the candidate sibling query to the group of one or more final sibling queries; and adding the group of top documents to the group of seen documents. The group of seen documents can include one or more top documents responsive to final sibling queries previously added to the group of final sibling queries.

Particular embodiments of the subject matter described in this specification can be implemented so as to realize one or more of the following advantages. Sibling query refinements for an initial query can be identified. The sibling query refinements can allow users to broaden their searches in a direction related to their initial queries, but different from their initial queries. The query refinements can help a user quickly find relevant search results by suggesting related queries which may contain results the user is looking for, and by allowing the user to explore and obtain new information that was not present with the user's initial query. The query refinements can also help users explore a topic of interest, for example, by suggesting phrases identifying related concepts. The sibling query refinements can be selected to maintain diversity between the results for the selected query refinements.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
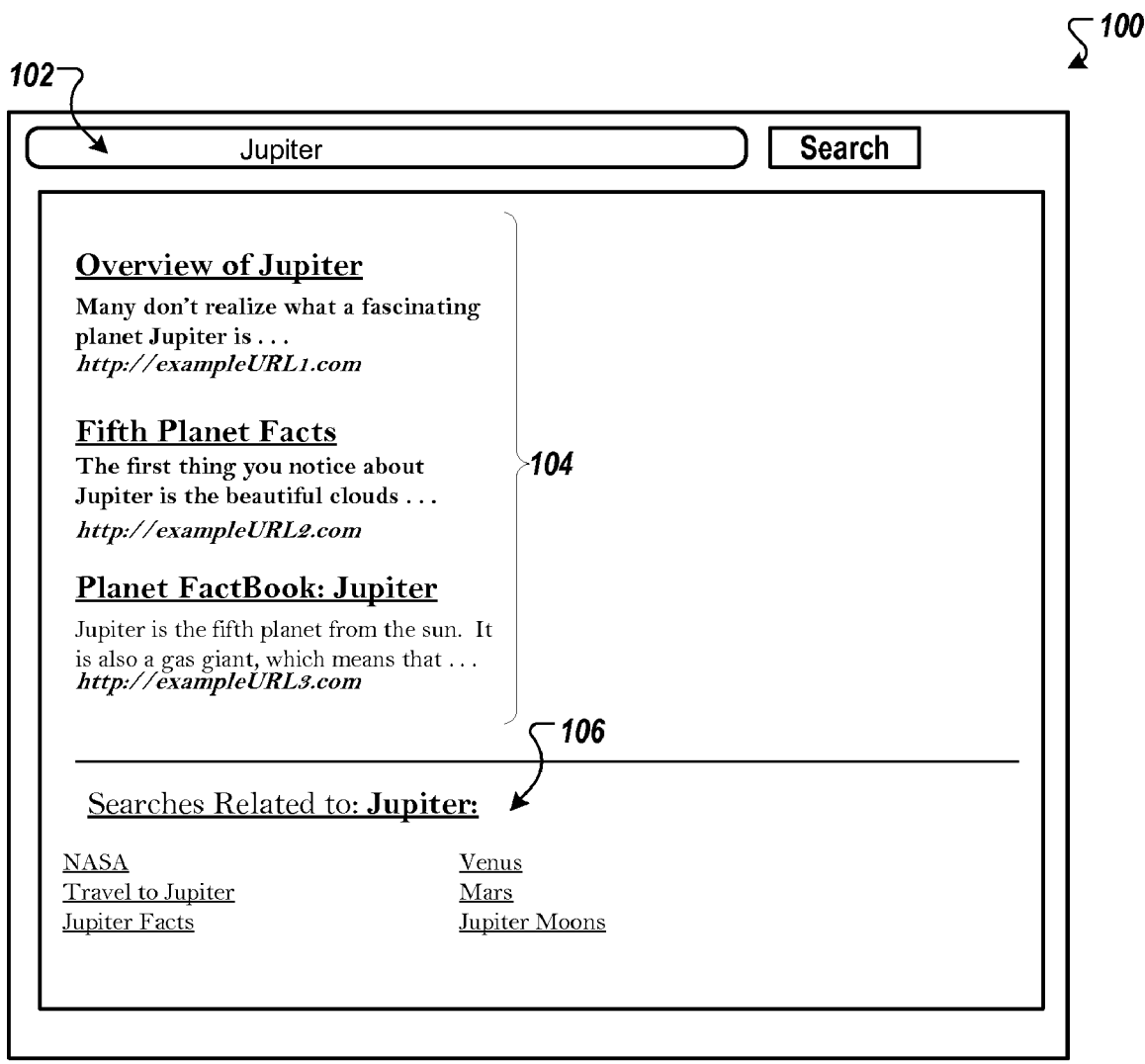
FIG. 1 illustrates an example graphical user interface that presents search results in response to a query, and also presents possible query refinements for the query.

FIG. 1 illustrates an example graphical user interface 100 that presents search results 104 in response to a query 102, and also presents possible query refinements 106 for the query 102. The query "Jupiter" 102 is submitted to a search engine through the graphical user interface 100, and a set of search results 104 that are responsive to the query 102 are generated by the search engine and presented in the user interface. While FIG. 1 show a visual display of search results, presenting search results can include various forms of presentation including, for example, transmitting search results to a user's computer for presentation to the user, transmitting search results to another device, transmitting sounds corresponding to the search results, providing haptic feedback corresponding to the search results, or transmitting signals comprising haptic feedback corresponding to the search results to a user's computer for presentation to the user. Other methods of presenting search results are possible.

Sometimes, the user's query will be a starting point for the exploration of a topic, and sometimes the user's query will be an attempt to find specific information. When users are exploring a topic, they are often looking for a general overview of the topic that may not be provided by search results alone. When the user is looking for specific information, the search results will often be what the user is looking for, and a user will click (e.g., select with a mouse or other input device, for example, a keyboard, or a tactile or an oral input device) one or more of the search results 104. However, a user will not always be satisfied with the search results 104 generated in response to a query. Users can be unsatisfied, for example, when the queries they submit are too broad. For example, when a user submits "Jupiter" but is really looking for "Jupiter moons," the search engine may identify search results that are relevant to Jupiter, but not relevant to the moons of Jupiter. Users can also be unsatisfied, for example, when the queries they submit use incorrect terminology. For example, a user may submit a query for "Jupiter," but really be interested in information on "Mars." Other reasons for user dissatisfaction are also possible.

To help users that were not presented with the search results they wanted (or to help users interested in exploring a topic of interest), the user interface 100 includes a group of query refinements 106, e.g., related queries that a user may find have responsive search results that are more relevant to the user's interests. A query refinement of a given query is another query that is related to the given query. Some of the query refinements 106 presented in the user interface 100 are sibling queries to the user-entered query "Jupiter" 102. The search engine (or another system) identifies the sibling queries from an analysis of user search log data, as described below. In general, two queries are siblings one or more users submit one of the queries after a given parent query, and one or more users submitted the other query after the given parent query.

When a user selects one of the query refinements 106, the search engine presents a new set of search results responsive to the query refinement in the user interface 100 and may optionally present a new group of query refinements for the selected query refinement.

Figure 2:
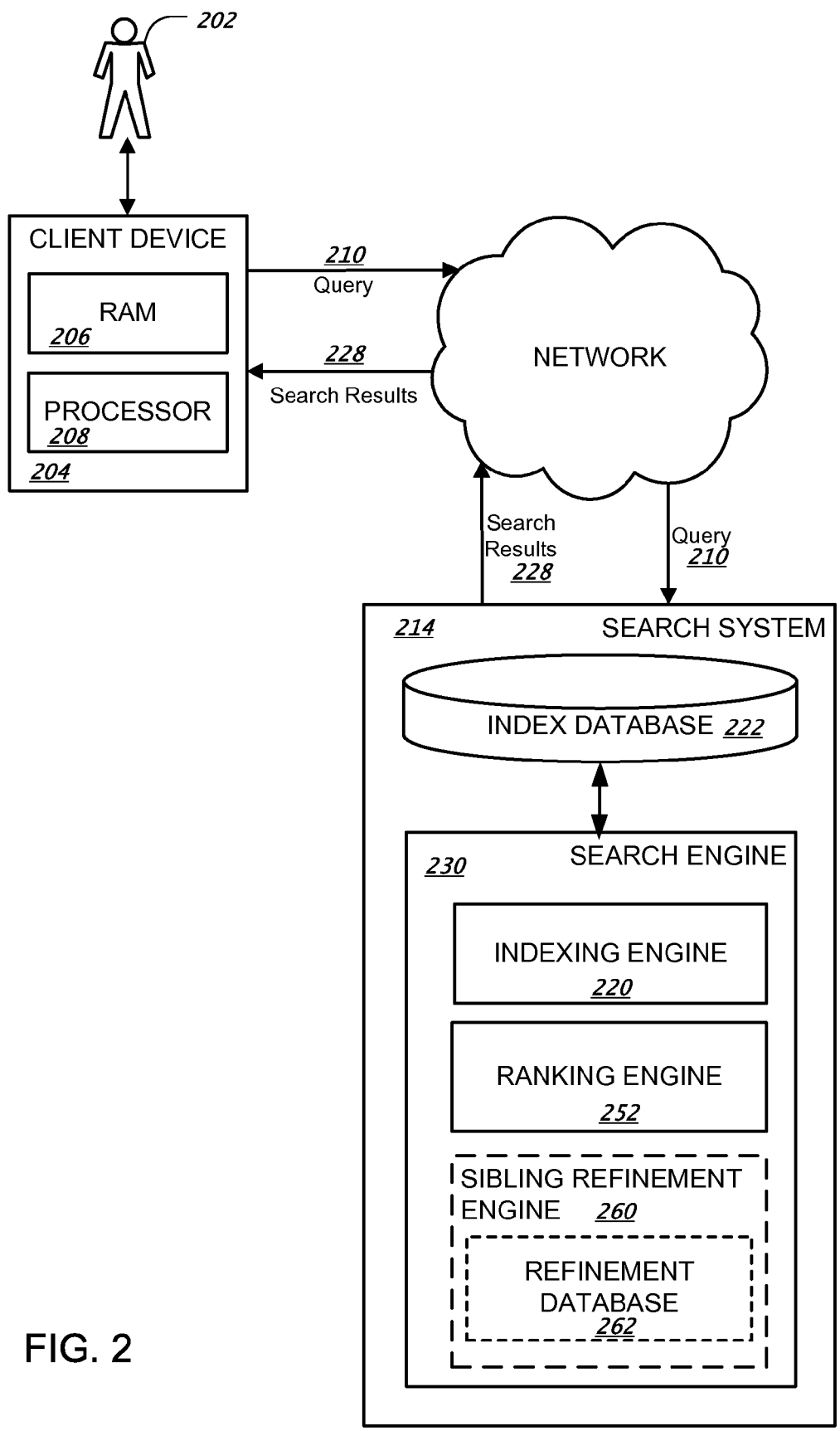
FIG. 2 illustrates an example search system.

FIG. 2 illustrates an example search system 214 for providing search results relevant to submitted queries as can be implemented in an internet, an intranet, or another client and server environment. The search system 214 is an example of an information retrieval system that can be used to generate the search results shown in FIG. 1 and to generate the query refinements 106 shown in FIG. 1.

A user 202 interacts with the search system 214 through a client device 204. For example, the client device 204 can be a computer (e.g., a personal computer, a mobile phone, etc.) coupled to the search system 214 through a wired or wireless local area network (LAN) or wide area network (WAN), e.g., the Internet. In some implementations, the search system 214 and the client device 204 are one machine. For example, a user can install a desktop search application on the client device 204. The client device 204 will generally include a random access memory (RAM) 206 and a processor 208.

A user 202 submits a query 210 to a search engine 230 within a search system 214. When the user 202 submits a query 210, the query 210 is transmitted through a network to the search system 214. The search system 214 can be implemented as, for example, computer programs running on one or more computers in one or more locations that are coupled to each other through a network. The search system 214 includes an index database 222 and a search engine 230. The search system 214 responds to the query 210 by generating search results 228, which are transmitted through the network to the client device 204 in a form that can be presented to the user 202 (e.g., as a search results web page to be displayed in a web browser running on the client device 204).

When the query 210 is received by the search engine 230, the search engine 230 identifies documents that match the query 210. The search engine 230 will generally include an indexing engine 220 that indexes documents (e.g., web pages, images, multimedia content, or news articles on the Internet) found in a corpus (e.g., a collection or repository of content), an index database 222 that stores the index information, and a ranking engine 252 (or other software) to rank the documents that match the query 210. The indexing and ranking of the documents can be performed, for example, using conventional techniques. The search engine 230 transmits the search results 228 through the network to the client device 204 for presentation to the user 202.

In some implementations, the search system further includes a sibling refinement engine 260 which generates sibling query refinements and stores them, for example, in a refinement database 262. The sibling refinement engine 260 is described in more detail below with reference to FIG. 3. The search engine can optionally retrieve refinements for the query 210 from the refinement database 262 and transmit them to the user 202 along with the search results 228.

Figure 3:
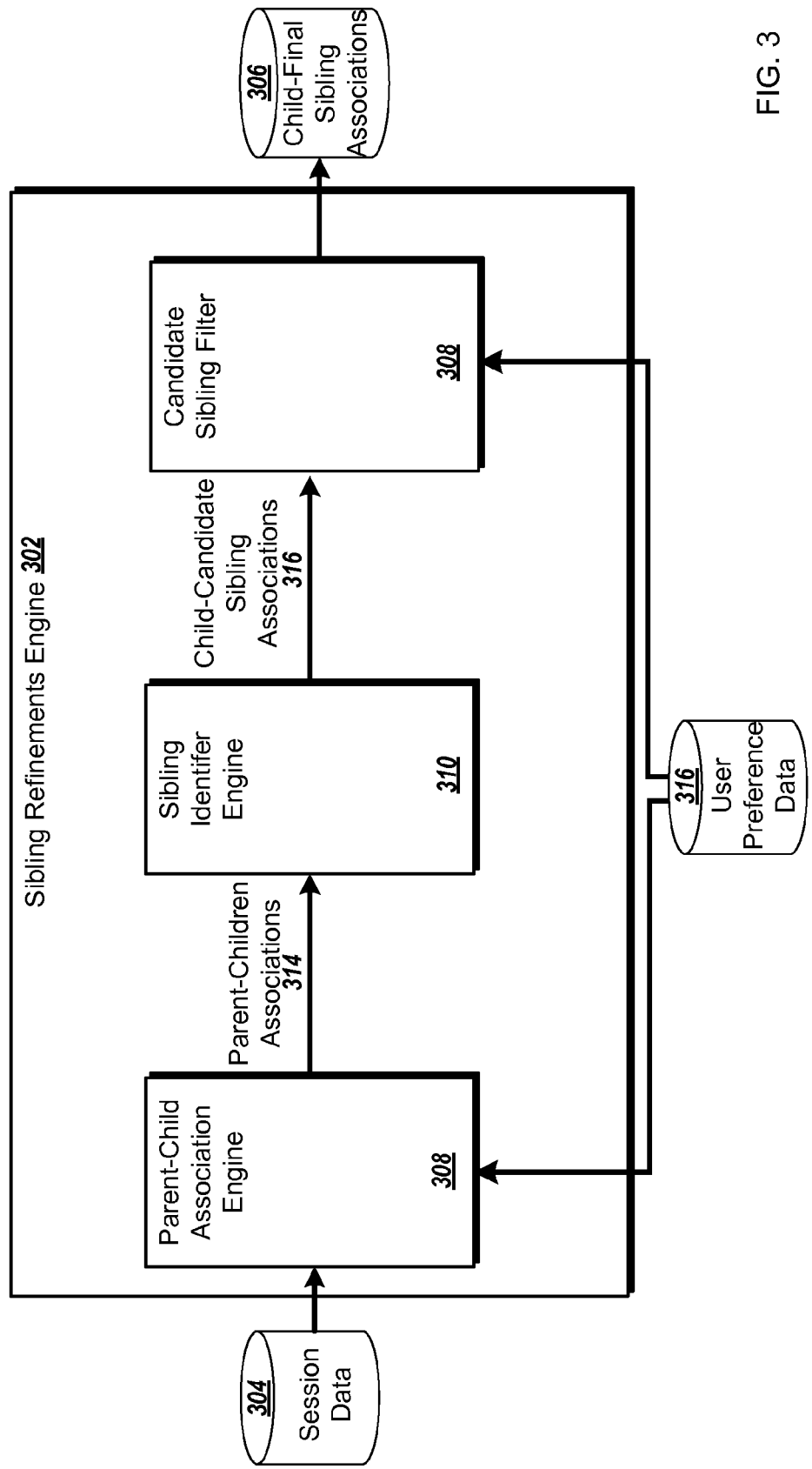
FIG. 3 illustrates an example sibling refinements engine.

FIG. 3 illustrates an example sibling refinements engine 302. The sibling refinements engine 302 is an example of the sibling refinements engine 260 described above with reference to FIG. 2. In general, the sibling refinements engine 302 analyzes user session data 304 and generates child query-final sibling associations 306. The final siblings for a given child query are associated with the child query as query refinements. In some implementations, the sibling refinements engine 302 is included in the search system 214 illustrated in FIG. 2. In alternative implementations, the sibling refinements engine 302 is separate from the search system, and provides refinements to the search system.

The sibling refinements engine 302 includes a parent-child association engine 308, a sibling identifier engine 310, and a candidate sibling filter 312. The boxes shown in FIG. 3 logically represent executing software components or modules. These components can be combined or subdivided in ways other than those shown in FIG. 3 and can be distributed on two or more computing devices.

The parent-child association engine 308 receives user session data 304 and generates parent-children associations 314 that associate parent queries with children queries. These parent-children associations 314 associate a parent with one or more child queries, and can include additional data for the parent and the child, for example, the number of times that a given child query appeared in the user session data 304 as a child of the parent query. The parent-child association engine 308 is described in more detail below with reference to FIG. 4.

The sibling identifier engine 310 receives the parent-children associations 313 and generates a group of candidate sibling queries 316 for one or more child queries. The sibling identifier engine 310 is described in more detail below with reference to FIG. 5.

The candidate sibling filter 312 receives the child-candidate sibling associations 316 and user preference data 318, and filters the candidate refinements 316 based on the user preference data 318. This filtering results in the set of child-final sibling associations 306. The candidate sibling filter 312 is described in more detail below with reference to FIG. 7.

Figure 4:
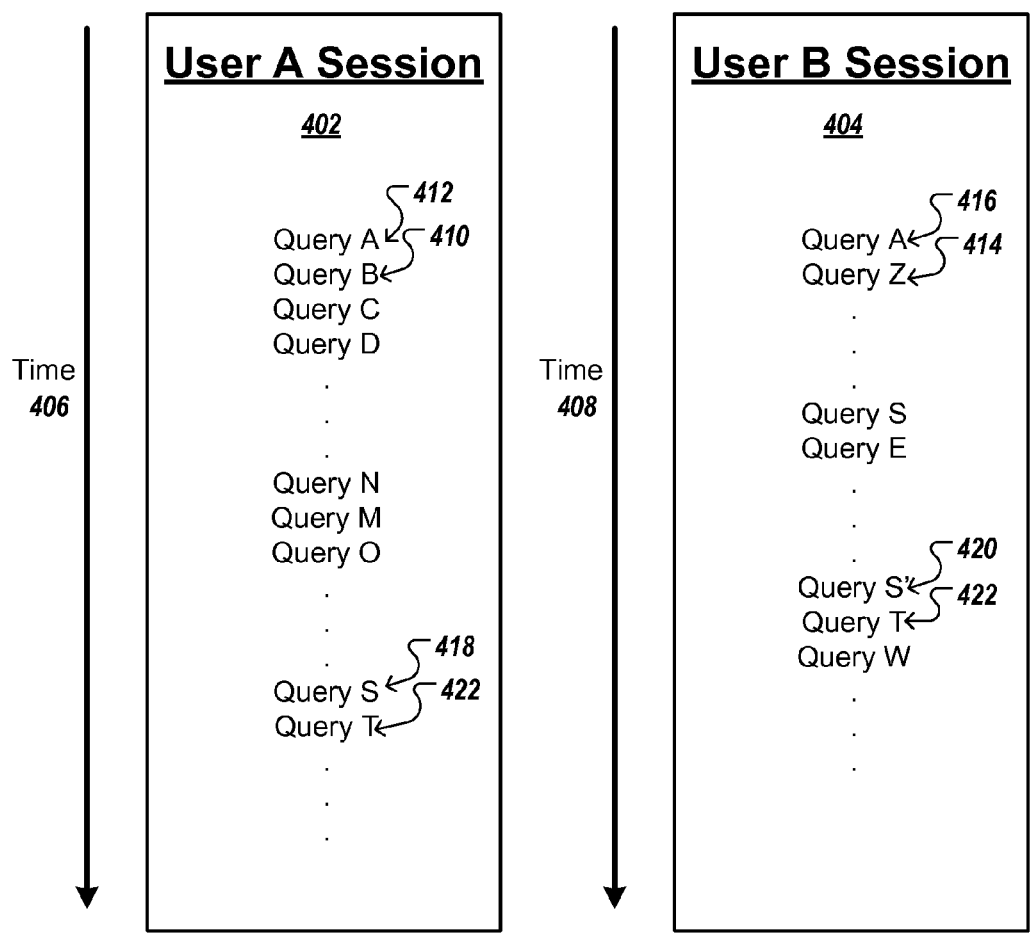
FIG. 4 illustrates example user sessions.

FIG. 4 illustrates example simplified user sessions, including session 402 for user A, and session 404 for user B. Each session is a period of time during which a single user is submitting queries. Sessions can be measured by a pre-defined period of time (e.g., 15 minutes), or a predefined period of inactivity (e.g., after 10 minutes without submitting a query). Users A and B submit queries during their respective sessions over time (e.g., time 406 for user A, and time 408 for user B).

A search system can maintain session data for a session indicating what queries a user submitted during the session, and optionally other information, such as what search results the user selected in response to the queries or how long the user viewed the search results. The session data can be anonymized for privacy protection. For example, the session data can refer to a user by only an Internet protocol (IP) address of a user device or can generate a unique random number that is associated with the IP address of the user device. Other anonymization processes, such as hashing, encryption and obfuscation techniques, can also be used to ensure that user privacy is protected. The session data can also be sanitized to remove suspect traffic. Suspect traffic can be, for example, traffic that has been identified as being generated by bots, traffic that has been identified as being spam, or repeat queries that are submitted by the same user in close succession to each other.

The parent-child association engine 308 processes the session data to identify children to associate with parent queries. In general, the parent-child association engine 308 associates a parent query with a child query when a user submitted the child query during a session after the user submitted the parent query during the session. In some implementations, the parent-child association engine 308 requires that there not be any intervening queries between the parent and child query during the session. For example, in the session 402 for user A, user A submitted query B 410 after user A submitted query A 412. Similarly, in the session 404 for user B, user B submitted query Z 414 after submitting query A 416. Therefore, query B 410 is a child query for query A 412, and query Z 414 is a child query for query A 416. In other implementations, the parent-child association engine 308 allows intervening queries provided they are not significantly syntactically different from the parent query, e.g., as measured by edit distance or other measures of similarity. For example, if a user submitted the three queries "restaurant," "restaurants," and "hamburger restaurants," the parent-child association engine might determine that restaurant and restaurants are sufficiently syntactically similar to associate "hamburger restaurant" with both queries.

In some implementations, the parent-child association engine 308 requires the parent and child query to meet additional requirements before they are associated with each other. For example, in some implementations, the session data includes information on what time queries were submitted. In these implementations, the parent-child association engine 308 can require that the child query follow the parent query within a threshold amount of time. The threshold amount of time can be determined, for example, empirically. The parent-child association engine 308 can determine the amount of time between the queries from the times stored in the session data.

As another example, in some implementations, the session data further includes whether users selected search results presented in response to queries, and optionally how long the users viewed the search results. In these implementations, the parent-child association engine 308 can require that a user who submitted the parent query and then the child query select a result presented in response to the child query, and can further optionally require that the user select the result within a threshold amount of time (e.g., 2 minutes). The parent-child association engine 308 can optionally require that the user view the result for a threshold amount of time (e.g., one minute) to verify that the result was useful to the query.

As yet another example, in some implementations, the parent-child association engine 308 requires parent queries to have an inverse document frequency (IDF) that is above a threshold. The inverse document frequency for a given parent query is the number of documents in a corpus of documents divided by the number of documents in the corpus of documents that include the text of the parent query. The corpus can be, for example, the corpus of documents indexed by the search system 214. Filtering out parent queries with an inverse document frequency that is below a threshold removes queries that are extremely popular concepts, and therefore may not impart as much information to their child queries. The threshold can be determined, for example, empirically.

In some implementations, the parent-child association engine 308 filters out some of the parent and child queries, and does not generate associations for the filtered out queries. For example, the parent-child association engine 308 can filter out the most popular queries submitted by users, queries that are identified as misspelled queries, or queries that include phrases (e.g., one or more words or symbols) on a list of phrases to filter. The parent-child association engine 308 determines whether a query is one of the most popular queries submitted by users by comparing the query to a list of the most popular queries. The list can be generated from an analysis of the session data. The parent-child association engine determines misspelling by running each query through a spell check engine that checks spelling, for example, using conventional techniques. The parent-child association engine 308 filters out queries that include phrases on a list of phrases to filter by matching phrases in the queries to phrases on the list. For example, the system can filter out queries that are pornographic (e.g., contain pornographic text or will lead to pornographic results), that contain offensive or racist or hate speech, or that contain text associated with URLs or advanced search engine operators (e.g., "www," ".com," ".net," or ":"). In some implementations, the list of phrase to filter is pre-defined. In alternative implementations, the list is generated using a machine learning engine that processes lists of known phrases to filter to identify other phrases that should also be filtered.

In some implementations, the parent-child association engine 308 identifies when the same child query is associated with duplicate parent queries, and then only associates the child query with one of the parent queries. For example, if the parent-child association engine 308 determines that query S 418 and query S' 420 are duplicate queries, then child query T 422 will only be associated with one of the parent queries S 418 and S' 420. The parent-child association engine 308 can determine which parent to associate with the child query, for example, by selecting the parent that is issued the most frequently in the user session data or by selecting the parent that is followed by the child query more frequently in the user session data.

In some implementations, the parent-child association engine 308 determines whether two parent queries are duplicate queries from a syntactical analysis of the queries. For example, if the two queries have an edit distance that satisfies, e.g., is below, a threshold, then the two queries can be determined to be duplicates. In other implementations, the parent-child association engine determines when two parent queries are duplicate queries from an analysis of user preference data 318. In general, the user preference data indicates how often users view specific result documents responsive to a query. The user preference data can be stored, for example, in a database that stores a tuple that associates each result document with a query and includes aggregated click data for all users that select the document in response to the query. The aggregated click data can be, for example, a tuple score. In general, the tuple score estimates how responsive users found a given document to be as a search result for a given query. For example, a tuple score can be an average of the weighted long clicks for a given document and query pair, a sum of the weighted clicks for a given document and query pair, or a click fraction for a given document and query pair. Various weights are also possible, for example, the clicks can be weighted by the length of the clicks (e.g., how long the user viewed the document), by how quickly a user clicked on a result, and whether a user clicked on a result first, second, third, etc. Various types of click fractions are possible. For example, in some implementations, the click fraction is calculated by dividing the number of clicks (or the number of weighted clicks) by the number of impressions (e.g., the number of times the document was presented as a search result for the query). In other implementations, the click fraction is calculated by dividing the sum of the weighted clicks by the total number of clicks. In still other implementations, the click fraction is the sum of weighted clicks for the document presented in response to the query divided by sum of weighted clicks for all documents presented in response to the query. Other click fractions are also possible. In various implementations, the data is specific to a geographic location (e.g., a city, metropolitan region, state, country, or continent), specific to a language preference of users (e.g., as specified by the users in a profile or as determined from user search behavior, for example, the language of the queries issued by the user), or specific to a locale (e.g., specific to a geographic location or a set of geographic locations, and optionally a language preference). The user preference data can be generated, for example, by the search system 214 or a user's web browser.

The parent-child association engine 308 determines whether two parent queries are duplicate queries based on a diversity score for the queries. The parent-child association engine 308 determines a group of unique documents that are responsive to the first parent query, but not the second query, or alternatively are responsive to the second parent query, but not the first parent query. The parent-child association engine 308 generates the unique documents from a top group of documents responsive to the first parent query and a top group of documents responsive to the second parent query. The top group of documents for each query includes, for example, a fixed number of the top documents, when the documents are ordered, for example, based on quality of result statistics for the document and the query, or all documents whose quality of result score for the query satisfies a threshold. The thresholds can be determined empirically, for example, to balance between having the threshold set too low, where insignificant documents that may not really be relevant to the query are included, and having the threshold set too high, where relevant documents will be excluded. The threshold or fixed number of documents may, but need not, be the same for the first parent query and the second parent query. Alternatively, the top group of documents for one or both queries can be documents whose quality of result statistic for the query satisfies a threshold (e.g., 0.025 or 0.05). Other methods of generating the group of unique documents are also possible. For example, in some implementations, the parent-child association engine 308 uses all documents responsive to the two queries.

Once the unique group of documents is identified, the parent-child association engine 308 calculates the diversity score from user preference data for the documents as search results for the second query, for example, by summing or averaging the quality of result statistics. If the diversity score for two parent queries satisfies, e.g., is below, a duplicate diversity threshold, then the two parent queries are identified as duplicates. The duplicate diversity threshold can be determined empirically.

Figure 5:
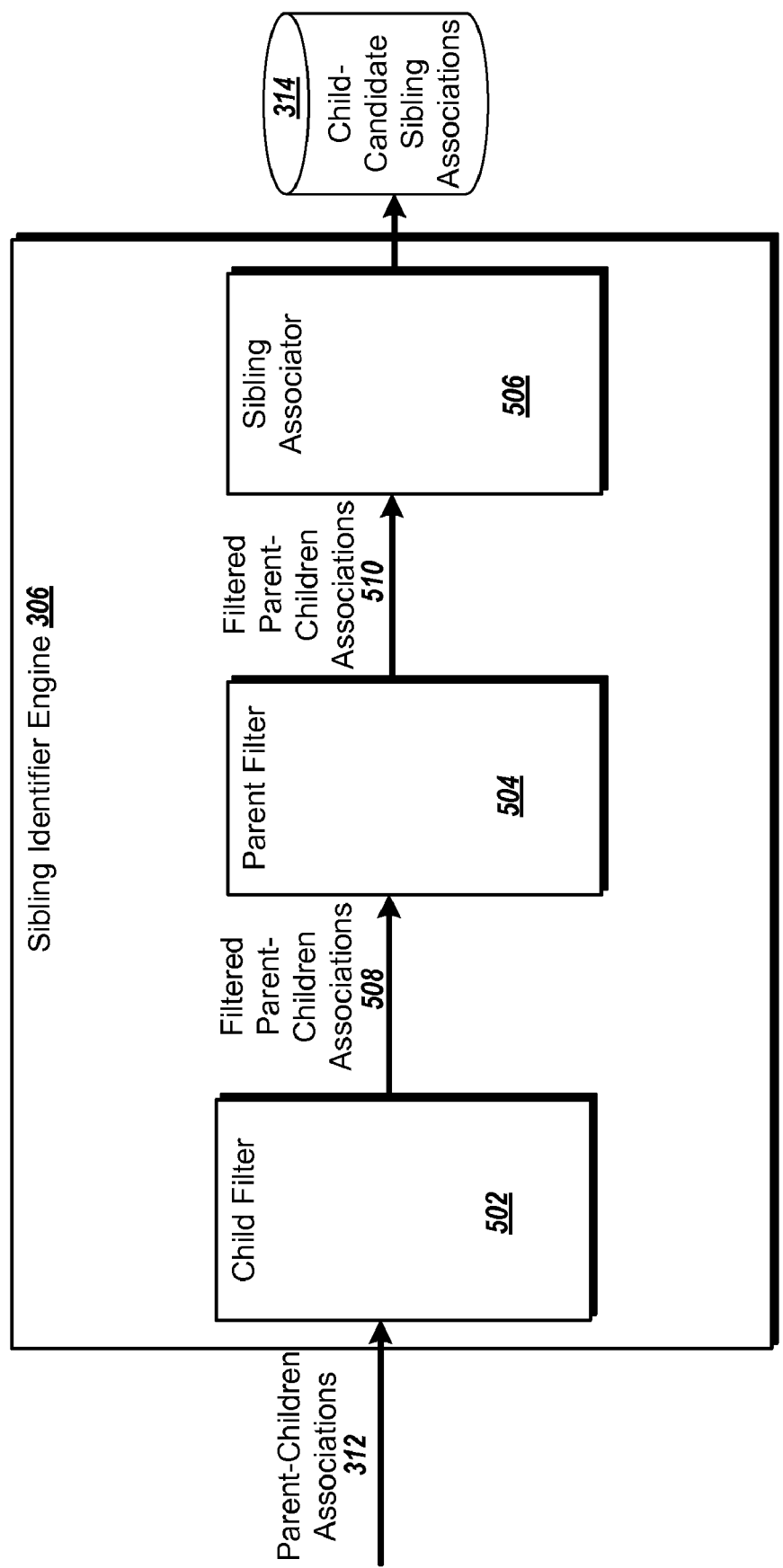
FIG. 5 illustrates an example sibling identifier engine.

FIG. 5 illustrates an example sibling identifier engine 306. The sibling identifier engine 306 receives parent child associations 312 and processes the associations to identify valid siblings for a given child query. In general, the valid siblings are siblings that have a low fan-in, that are related to the given child query through parent queries that have a low fan-out, and that have a strong relationship to the child query. The sibling identifier engine 306 includes a child filter 502, a parent filter 504, and a sibling associator 506 that check for these various qualities. These filters shown in FIG. 5 can be combined or subdivided in ways other than those shown in FIG. 5 and can be applied in a different order than what is described below.

The child filter 502 process the parent-children association data 312, and filters out child queries that have a fan-in value that exceeds a fan-in threshold. The fan-in value for a given child query is the number of parent queries that the child query is associated with. The more parents that a query has, the less important the individual connection to any given parent is. The fan-in threshold can be determined empirically.

In some implementations, the child filter 502 does additional filtering. For example, in some implementations, the child filter 502 normalizes the child queries, for example, using stemming, and filters the child queries to remove syntactic duplicates. As another example, in some implementations, the child filter 502 filters out child queries that have a measure of usefulness that does not satisfy a threshold. For example, the child filter can filter out child queries whose click through rate does not satisfy a threshold, or can filter out child queries whose overall number of weighted clicks across all documents presented in response to the child query divided by the overall number of weighted impressions across all documents presented in response to the child query satisfies a threshold. The threshold can be determined empirically.

The parent filter 504 processes the filtered parent-children association data 508 and filters out parent queries that have a fan-out value that exceeds a fan-out threshold. The fan-out value for a given parent query is the number of child queries associated with the parent query. The more children that a parent query has, the less important the connection to the parent query is for any given child query. The fan-out threshold can be determined empirically.

The parent filter 504 can do additional filtering as well. For example, the parent filter 504 can filter out all parent queries that are not high-quality parent queries. In general, a high-quality parent query is a parent query that adds information to each of its children queries. Various metrics for determining what makes a parent query a high quality parent query can be used. In some implementations, the parent filter 504 filters out parent queries that have an inverse document frequency (IDF) that is below a threshold. Filtering out parent queries with an inverse document frequency that is below a threshold removes queries that are extremely popular concepts, and therefore may not impart as much information to their child queries. The threshold can be determined, for example, empirically. In some implementations, the parent filter 504 filters out parent queries that are on a list of queries to filter out. The list can include, for example, the most commonly submitted queries, e.g., as determined from session data, or can include queries with click-through-rates or other measures of usefulness to users that are below a threshold.

In some implementations, the parent filter 504 filters out parent queries for particular children. In these implementations, the parent query may remain in the filtered parent-children associations data 510 as a parent for other child queries, but will no longer be associated with a particular child as the parent of that child. For example, in some implementations, the parent filter 504 filters out a parent query for a particular child query when the parent query is a superstring of the child query. A parent query is a superstring of a child query when the parent query contains the text of the child query and additional text. Often, when users enter query superstrings, the users first start from a shorter parent query, and then refine the parent query using a child query that is a superstring of the parent query. When a user does the opposite, it indicates that the child query is less likely to have been intended by the user as a query refinement for the parent query. As another example, in some implementations, the parent filter 504 filters out parent queries for child queries when the parent queries do not have a sufficient syntactical difference from the child queries. The parent filter 504 can determine that a parent query does not have a sufficient syntactical difference from a child query, for example, by determining that the edit distance between the two queries is below a threshold.

The sibling associator 506 receives the filtered parent-children associations 510, analyzes the associations, and generates child-candidate sibling associations that associate a given child query with one or more sibling queries. The sibling associator 506 associates a child query and a candidate sibling when the number of parent queries shared by the child query and the sibling query in the filtered parent-child associations data 510 satisfies a threshold. The threshold is determined, for example, empirically. In some implementations, the sibling associator 506 determines that the sibling query is a superstring of the child query, or vice versa, and then uses a lower threshold. The lower threshold can be, for example, zero.

In some implementations, the sibling associator 506 also requires that there be a satisfactory strength of relationship between a child query and a sibling query before the two queries are associated. The sibling associator 506 measures the strength of the relationship between a child query and its sibling query from the strength of relationship each query has with the common parents shared between the two queries. The strength of the relationship between a parent query and a child query is derived from the number of times users submitted the parent query and then submitted the child query during a session (e.g., as determined from the session data 304). In some implementations, the strength of relationship between a parent query and a child query is weighted by a weight that is inversely proportional to the fan-out of the parent query, inversely proportional to the fan-in of the child query, or both. The strength of relationship is satisfactory, for example, if it satisfies a threshold. The threshold can be determined empirically.

Figure 6:
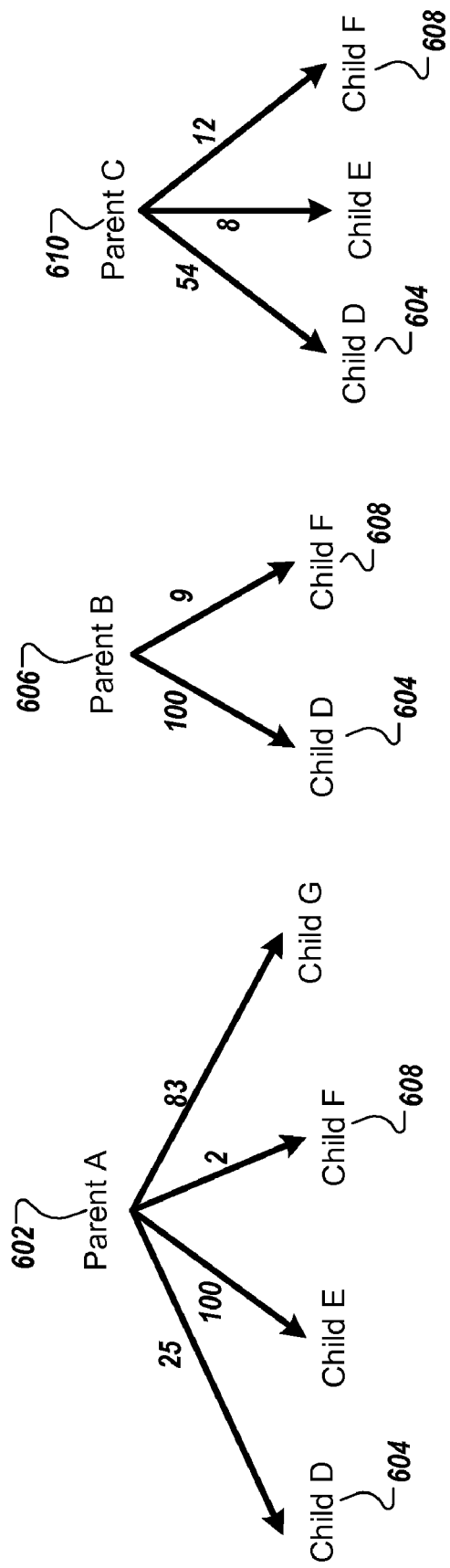
FIG. 6 illustrates example strengths of relationships between parent queries and child queries.

FIG. 6 illustrates example strengths of relationships between parent queries and child queries. For example, the strength of relationship between parent A 602 and child D 604 is 25, because users who submitted parent A during a session then submitted child D during the same session 25 times. Similarly, the strength of relationship between parent B 606 and child D 604 is 100. In some implementations, the sibling associator 506 aggregates the strengths of relationship between the child query and each common parent, and between the sibling query and each common parent, and determines if the aggregated strength of relationship satisfies, e.g., exceeds, a threshold. If so, the two queries are associated as child and sibling. For example, to determine the strength of relationship between child D 604 and child F 608, the sibling associator would determine that the two children have three common parents: parent A 602, parent B 606, and parent C 610, that Child D 604 has a strength of relationship of 25 with parent A 602, a strength of relationship of 100 with parent B 606, and a strength of relationship of 54 with parent C 610, and that child F 608 has a strength of relationship of 2 with parent A 602, a strength of relationship of 9 with parent B 606, and a strength of relationship of 12 with parent C 610. The aggregate strength of relationship is thus 25+100+54+2+9+12=202.

In other implementations, the sibling associator 506 considers the strength of relationships for the child query and the sibling query through each common parent. For example, the sibling associator 506 can consider each common parent in turn, add the strength of relationship between the child query and the common parent and the strength of relationship between the sibling query and the common parent, and determine if the strength through the common parent satisfies a strength threshold. The sibling associator 506 then determines if the number of common parents through which the strength of the relationship satisfies the strength threshold satisfies, e.g., exceeds, a number of common parents threshold. The strength threshold and the number of parents threshold can be determined, for example, empirically. For example, to determine the strength of relationship between child D 604 and child F 608, the sibling associator would determine that the two children have three common parents: parent A 602, parent B 606, and parent C 610, that the strength of relationship through parent A 602 is 25+2=27, that the strength of relationship through parent B 606 is 100+9=109, and that the strength of relationship through parent C 610 is 54+12=66. If enough of those strengths of relationship satisfy the strength threshold, then the sibling associator 506 would relate the two queries as siblings.

While the above examples describe generating the strength of relationship by summing the strengths between individual child and parent queries, other aggregation techniques can also be used, for example, calculating the minimum, maximum, median, or mean strengths between individual child and parent queries.

In some implementations, the sibling associator 506 further filters which children are associated as siblings. For example, in some implementations, the association is a one-way association, e.g., a first child query is a sibling of a second child query, but the second child query is not a sibling of the first child query. In some implementations, the sibling associator 506 determines whether the relationship should be one-way from a comparison of the relative number of times the two queries were submitted immediately after their common parent queries. For example, in FIG. 6, child D 604 was submitted 179 times, and child F 608 was only submitted 23 times. Therefore, child D 604 is a significantly more popular query refinement for the common parent queries than child F is. The sibling associator 506 therefore will associate child D 604 with child F 608 as a sibling of child F 608, but will not associate child F 608 with child D 604 as a sibling of child D 604. This is because while child D 604 will likely be useful to users who submitted child F 608, child F 608 will likely not be useful to users who submitted child D 604, given how infrequently child F 608 is a refinement from the common parents. In some implementations, the sibling associator 506 alternatively or additionally determines whether the relationship should be one-way from a comparison of a quality metric for the two queries. The quality metric can be, for example, a click through rate or other metric derived from user preference data. If one query has a high quality metric and the other query has a low quality metric, the sibling associator 506 associates the high quality metric query with the low quality metric query as a sibling of the low quality metric query, but does not associate the low quality metric query with the high quality metric query as a sibling of the high quality metric query. This is because the low quality metric indicates that the low quality metric query may not be useful to users. In some implementations, the sibling associator 506 alternatively or additionally determines whether the relationship should be one-way from a characteristic of one of the queries. For example, if one query is pornographic or offensive (e.g., when one or more terms or phrases in the query appear on a list of pornographic or offensive terms), the sibling associator 506 does not associate the pornographic or offensive query with any other queries as a sibling of those other queries.

As another example, in some implementations, the sibling associator 506 determines the difference in inverse document frequency between two child queries, and does not associate the two child queries as siblings if the difference exceeds a threshold. As yet another example, in some implementations, the sibling associator 506 does not associate two child queries as siblings if they have any words in common.

As another example, in some implementations, the sibling associator 506 does not associate two children as siblings when one includes a geographic location and one does not include a geographic location. For example, if one child query is "department store" and another child query is "department store near San Francisco," the sibling associator 506 would not associate the two queries as siblings, because "San Francisco" is a geographic location, and the query "department store" does not include a geographic location. This filtering is useful when a concept is popular in many locations (for example, when the original query is for a restaurant chain). In these situations, it is unlikely that the particular geographic location included in one of the child queries will match the user's geographic location, and the user is likely to be frustrated if they are presented with completely irrelevant refinements. In some further implementations, the sibling associator 506 associates the two queries as siblings, but flags that one of the queries includes a location. At a later time when a user submits a query for the sibling that does not include the location, the user's geographic location is estimated (for example, using an Internet Protocol (IP) address of the computer from where the query is submitted, and the search system determines whether that location is close enough in the query refinement (e.g., within 100 miles). If the locations are close enough, the sibling with the location is presented to the user as a query refinement. If the locations are not close enough, the sibling is not presented to the user.

Figure 7:
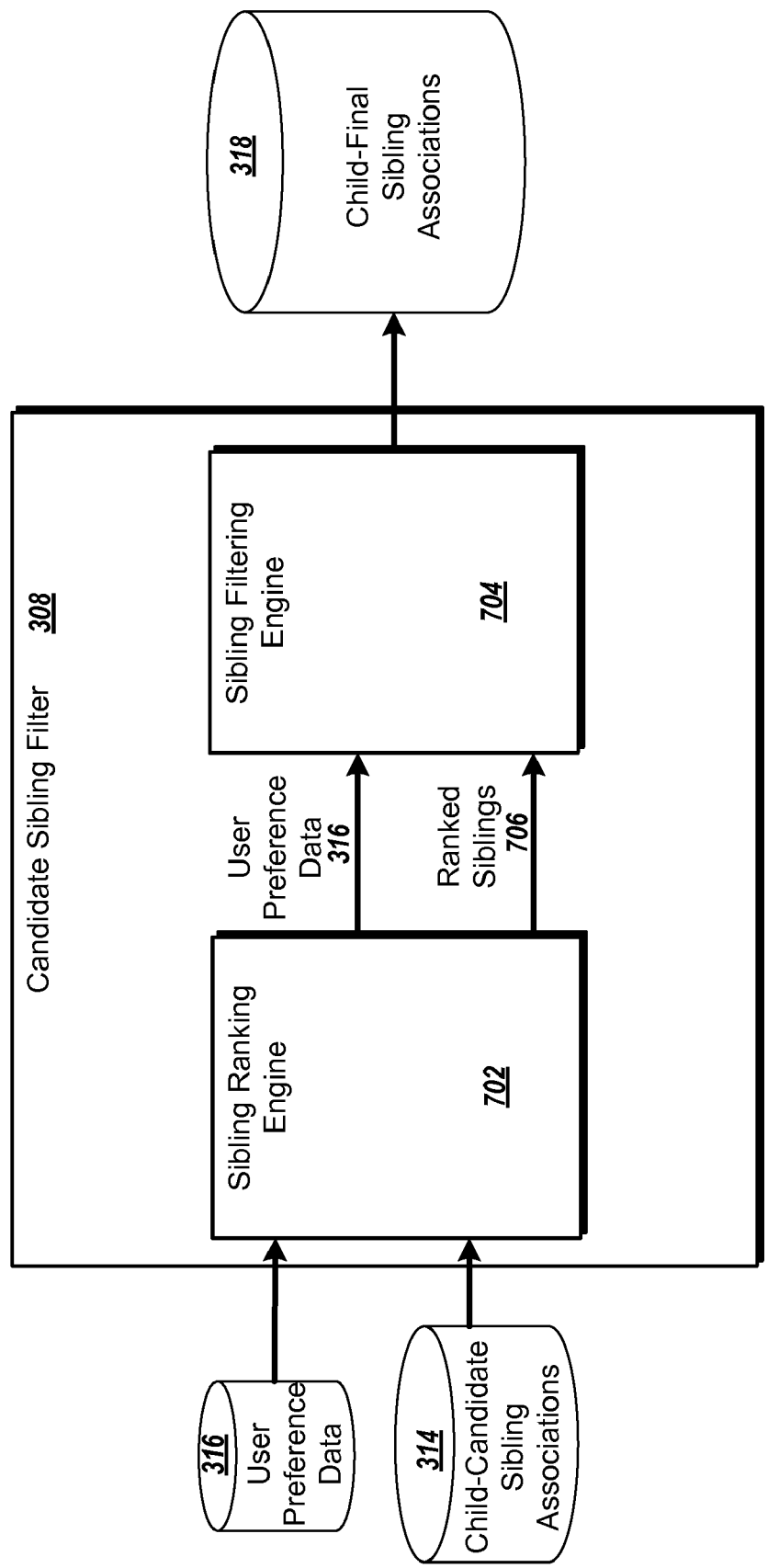
FIG. 7 illustrates an example candidate sibling filter.

FIG. 7 illustrates an example candidate sibling filter 312 that is part of the sibling refinement engine 302 illustrated in FIG. 3. The candidate sibling filter 312 is an example candidate sibling filter. Alternative sibling filters can alternatively, or additionally, be used.

The candidate sibling filter 308 includes a sibling ranking engine 702 and a sibling filtering engine 704. The boxes shown in FIG. 7 logically represent executing software components or modules. These components can be combined or subdivided in ways other than those shown in FIG. 7 and can be distributed on two or more computing devices.

The sibling ranking engine receives the child-candidate sibling associations 314 generated by the sibling identifier engine 310, as well as user preference data 316, and then ranks the candidate siblings for each child query using the user preference data, resulting in a ranked group of siblings 706 for each child query.

The sibling ranking engine 702 can use various metrics to rank the candidate siblings. In some implementations, the sibling ranking engine 702 ranks the candidate siblings for a given child query according to the number of parent queries shared by the given child query and each sibling. In these implementations, the sibling ranking engine 702 can optionally use a superstring bias, where candidate siblings that are superstrings of the child query are given an increased rank. In other implementations, the sibling ranking engine 702 ranks the candidate siblings for a given child query according to an analysis of user preference data. For example, the sibling ranking engine 702 can determine, for each candidate sibling query, what fraction of the documents selected by users after a sibling query was submitted were also selected by users after parent queries shared by the sibling query and the child query were submitted. The sibling ranking engine 702 can then rank the candidate sibling queries in descending order of the fraction values.

In still other implementations, the sibling ranking engine 702 ranks the candidate sibling queries for each child query according to the quality of result statistics (e.g., click fractions or weighted clicks) in the user preference data 316 for the candidate sibling queries (e.g., in order from highest to lowest quality of result statistic). In still other implementations, the sibling ranking engine 702 ranks the candidate sibling queries for each child query according to the click-through-rate for each candidate sibling query, that is, the total number of clicks on documents presented in response to the candidate sibling query, divided by the total number of impressions for documents presented in response to the candidate sibling query. In still other implementations, the sibling ranking engine 702 ranks the candidate sibling queries according to a weighted click-through-rate for each candidate sibling query, for example, where the clicks on each document are weighted by how long the documents were viewed. Other ranking metrics are also possible. For example, in some implementations, the candidate sibling queries are ranked by a measure of their popularity as queries (e.g., how often do users submit the candidate sibling queries). In other implementations, compound metrics are used. For example, in some implementations, the candidate sibling queries are ranked based on the number of words they have in common with their child query. Ties are broken using one of the metrics described above.

The sibling filtering engine 704 receives the ranked candidate siblings 706 for each child query and processes them in order, to select the best group of final siblings for each child query. The final siblings 318 for each child query are associated with the child query as query refinements for the child query.

The sibling filtering engine 704 selects the final sibling queries for a given child query as follows. First, the sibling filtering engine 704 initializes a group of seen documents. In some implementations, the sibling filtering engine 704 initializes the group of seen documents by selecting a top number of documents responsive to the child query (e.g., a top number of the documents responsive to the child query, ranked for example, by a quality of result statistic, or all documents responsive to the child query having a quality of result statistic satisfying a threshold). In alternative implementations, the sibling filtering engine 704 selects the top-ranked candidate sibling query for the child query, identifies the sibling as a final sibling for the child query, and initializes a set of seen documents to be a top number of documents responsive to the final sibling (e.g., a top number of the documents responsive to the final sibling, ranked for example, by a quality of result statistic, or all documents responsive to the query having a quality of result statistic satisfying a threshold).

The sibling filtering engine 704 then processes the candidate siblings (or the rest of the candidate siblings, if the first candidate sibling has already been selected) in order, until a desired number of final siblings have been selected, or all candidate siblings have been considered. For each additional candidate sibling, the sibling filtering engine 704 calculates an intra-sibling diversity score between the seen documents (or a subset, such as a top number (e.g., 5) of the seen documents) and documents (or a subset of the documents, such as a top number (e.g., 5)) responsive to the additional candidate sibling. If the intra-sibling diversity score satisfies a threshold, the sibling filtering engine 704 selects the additional candidate sibling as a final sibling for the child query and adds a top number of documents responsive to the additional candidate sibling to the set of seen documents. If the intra-sibling diversity score does not satisfy the threshold, the sibling filtering engine 704 moves on to the next candidate sibling query. The threshold can be determined, for example, empirically.

The sibling filtering engine 704 calculates an intra-sibling diversity score for a candidate sibling query from user preference data (e.g., quality of results statistics, or other data) for documents that are in the top documents for the candidate sibling query but are not in the group of seen documents. The intra-sibling diversity score thus measures how good the different search results that would be seen in response to the candidate sibling query are. The sibling filtering engine 704 determines the intra-sibling diversity score, in the same way the parent-child association engine 308 determines the diversity score between documents responsive to two parent queries.

In some implementations, the sibling filtering engine 704 also performs additional checks on each candidate sibling query before the candidate sibling query is added to the final group of sibling queries for a given child query. For example, the sibling filter engine 704 can require that a candidate sibling query be sufficiently syntactically different from either the child query or the final sibling queries that have already been selected. The sibling filter engine 704 can determine whether two queries are sufficiently syntactically different, for example, by determining that the edit distance for the two queries exceeds a distance threshold. The distance threshold can be determined empirically. As another example, the sibling filter engine 704 can require that a candidate sibling query receive a sufficient number of clicks, or weighted clicks, on search results responsive to the candidate sibling query. The sibling filter engine 704 determines how many clicks a candidate sibling query received from an analysis of the user preference data, for example, by aggregating the individual click counts for each query-document tuple for the candidate sibling query. The sibling filter engine 704 then compares the number of clicks, or weighted clicks, to a click threshold. The click threshold can be determined empirically.

Figure 8:
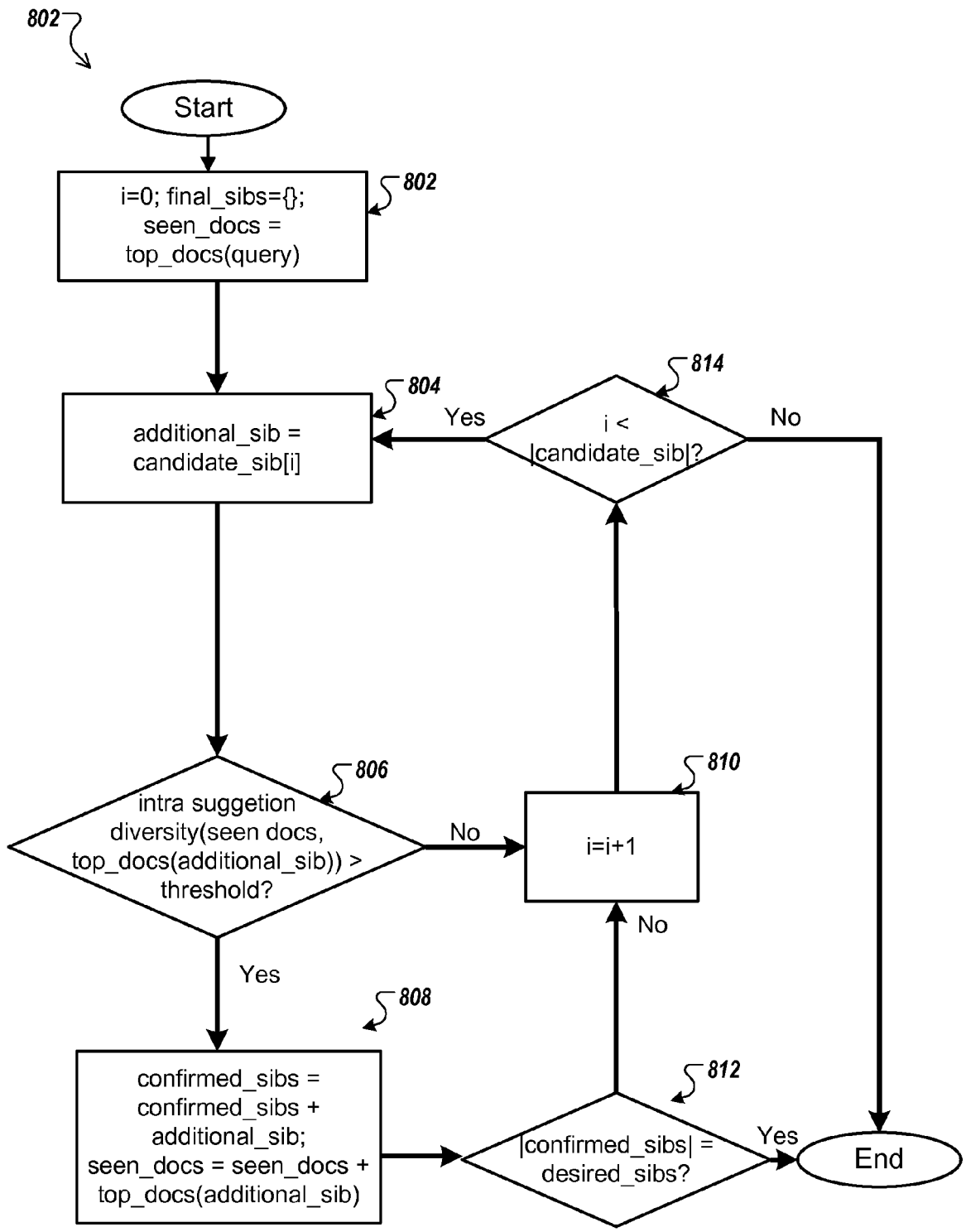
FIG. 8 illustrates an example method for selecting a group of final sibling queries refinements for a child query from a group of candidate sibling queries for the child query.

FIG. 8 illustrates an example method 800 for selecting a group of final sibling queries for a child query from a group of candidate sibling queries for the child query. For convenience, the example method 800 will be described in reference to a system that performs the method 800. The system can be, for example, the candidate sibling filter 308.

In FIG. 8, i is a counter variable that tracks which of the candidate siblings for a child query is being processed, confirmed_sibs is the group of final siblings that have been selected for the query, seen_docs is the set of top documents responsive to each of the final siblings, additional_sib is the candidate sibling that is currently being processed, top_docs is the top number of documents responsive to a candidate sibling, desired_sibs is the desired number of final siblings, and query is the child query for which the final siblings are being selected.

The system begins by setting a counter variable i to 0, setting the group of final siblings to the empty set, and initializing the seen documents to the top documents for the query (step 802), for example, as described above with reference to FIG. 7. In alternative implementations, the system initializes i to be 1, the group of final siblings to be the first candidate sibling in the order, and the seen documents to be the top documents for the first candidate sibling in the order, for example, as described above with reference to FIG. 7.

The system then processes the candidate siblings. The system selects the candidate sibling identified by the counter as the additional_sib (step 804). The system then calculates an intra-sibling diversity score between a top number of documents responsive to additional_sib and the seen_docs, and compares the intra-sibling score to a threshold (step 806), for example, as described above with reference to FIG. 7. If the intra-sibling diversity score satisfies the threshold, e.g., exceeds the threshold, then additional_sib is added to the group of confirmed_sibs, and the top documents for additional_sib are added to the group of seen_docs (step 808). The system continues to process the additional siblings by incrementing i (step 810), until the system determines that a desired number of final siblings have been identified (step 812) or until all candidate siblings have been processed (step 814).

Figure 9:
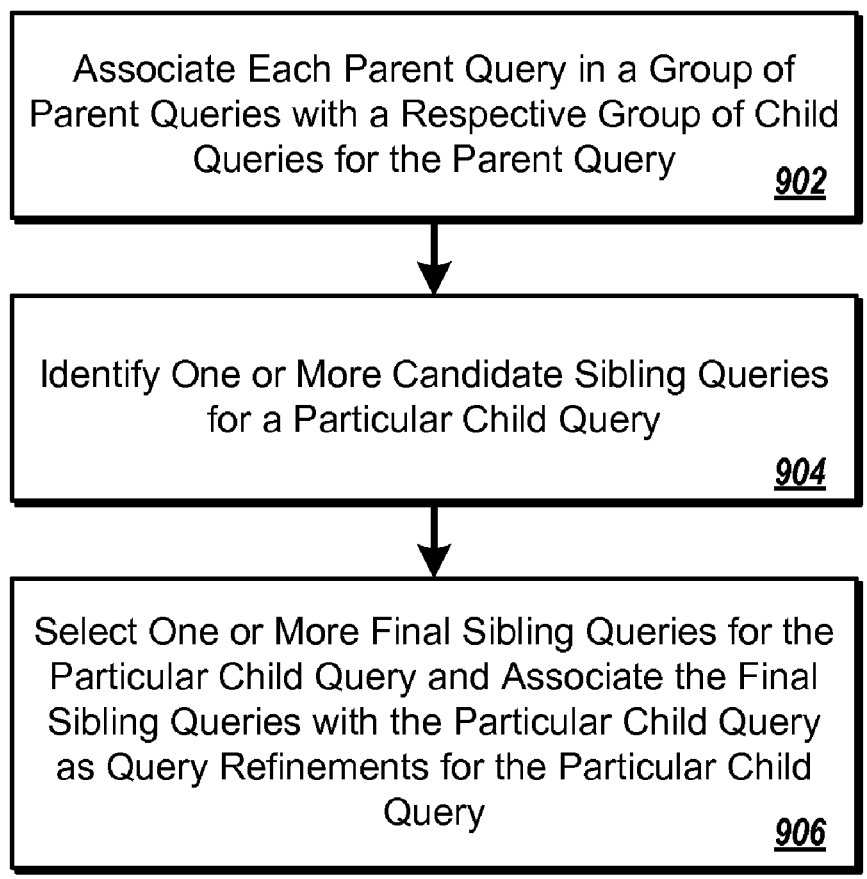
FIG. 9 illustrates an example method for identifying sibling query refinements.

FIG. 9 illustrates an example method 900 for identifying sibling query refinements. For convenience, the example method 900 will be described in reference to a system that performs the method 900. The system can be, for example, the sibling refinements engine 302.

The system associates each parent query in a group of parent queries with a respective group of child queries for the parent query (step 902), for example, as described above with reference to FIG. 4. The system identifies one or more candidate sibling queries for a particular child query (step 904), for example, as described above with reference to FIGS. 5 and 6. The system selects one or more final sibling queries for the particular child query and associates the final sibling queries with the particular child query as query refinements (step 906). In some implementations, the system selects the final siblings according to the diversity among documents responsive to the final siblings, for example, as described above with reference to FIGS. 7 and 8. In some implementations, the system selects the final siblings according to other criteria, for example, their syntactic similarity to each other or to the particular child query.

In some implementations, when a user submits a query for the particular child query, a search engine presents the final siblings to the user as suggested query refinements for the query. In these implementations, the final siblings can be sorted according to various heuristics. For example, the final siblings can be sorted according to the number of clicks received on search results presented in response to the sibling queries, the click through rate for the sibling queries, or the number of common parents shared between the particular child query and each sibling query.

Figure 10:
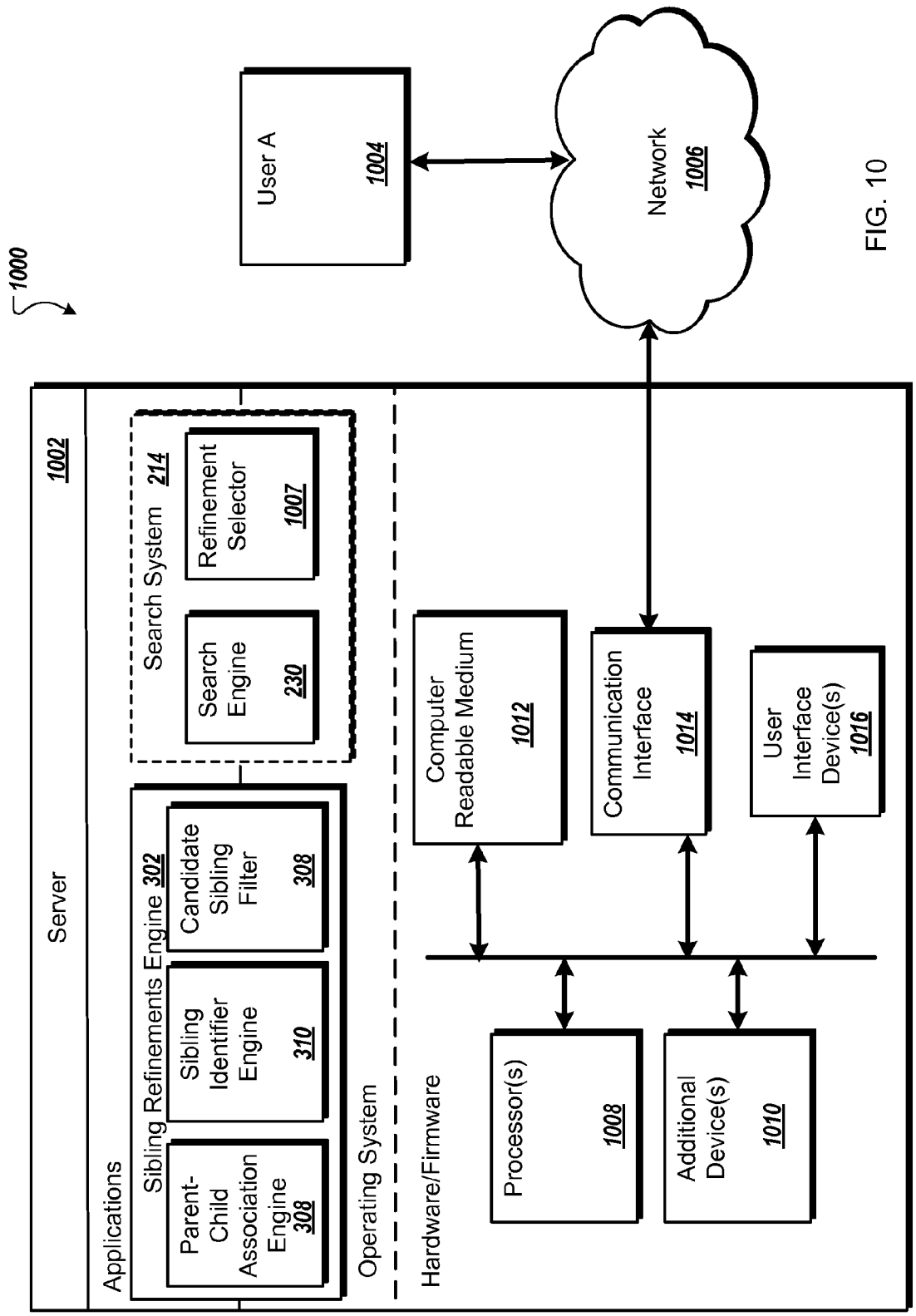
FIG. 10 illustrates an example architecture of a system.

FIG. 10 illustrates an example architecture of a system 1000. The system consists of a server 1002 and one or more user computers such as user computer A 1004. The server 1002 and user computers are connected through a network 1006.

The server 1002 consists of one or more data processing apparatus. While only one data processing apparatus is shown in FIG. 10, multiple data processing apparatus can be used. The server includes various modules, e.g. executable software programs, including a sibling refinements engine 302 and a search system 214. Each module runs as part of the operating system on the server, runs as an application on the server, or runs as part of the operating system and part of an application on the server.

The sibling refinements engine 302 includes a parent-child association engine 308, a sibling identifier engine 310, and a candidate sibling filter 308. These components are described above with reference to FIGS. 3-7.

The optional search system 214 includes a search engine 230 and a refinement selector 1007. The search system 214 uses the search engine 1007 to generate search results responsive to queries, for example, as described above with reference to FIG. 2. The refinement selector 1007 selects sibling refinements for a given child query that were selected by the sibling refinements engine 302. The search system 214 then presents the sibling refinements to a user along with search results responsive to the query.

The server 1002 can also have hardware or firmware devices including one or more processors 1008, one or more additional devices 1010, a computer readable medium 1012, a communication interface 1014, and one or more user interface devices 1016. Each processor 1008 is capable of processing instructions for execution within the server 1002. In some implementations, the processor 1008 is a single-threaded processor. In other implementations, the processor 1008 is a multi-threaded processor. Each processor 1008 is capable of processing instructions stored on the computer readable medium 1012 or on a storage device (e.g., an additional device 1010). The server 1002 uses its communication interface 1014 to communicate with one or more computers, for example, over a network. Examples of user interface devices 1016 include a display, a camera, a speaker, a microphone, a tactile feedback device, a keyboard, and a mouse.

The server 1002 can store instructions that implement operations associated with the modules described above, for example, on the computer readable medium 1012 or one or more additional devices 1010, for example, one or more of a floppy disk device, a hard disk device, an optical disk device, or a tape device. In some implementations, the data processing apparatus 1002 also stores additional data, for example, user preference data, parent-query associations, candidate siblings, final siblings, or other data, on the computer readable medium 1012 or one or more additional devices 1010.

User computers such as user computer A 1004 are connected to the server 1002 through the network 1006. Users submit search queries to the server 1002 and select search results received from the server 1002 using user computers such as user computer A 1004, for example, using a webbrowser running on the computer. The server 1002 generates user preference data from the actions of the users, for example, by tracking what search queries are submitted by users and what search results responsive to a query are selected by users. Users can also use user computers such as user computer A 1004 to submit search queries to the server 1002 and to view search results responsive to their queries, as well as query refinements for the queries.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    associating each of a plurality of parent queries with a respective group of one or more child queries for the parent query, wherein each child query was submitted during a respective session following submission of its associated parent query during the session;
    identifying one or more candidate sibling queries for a particular child query, wherein the particular child query is a child query for one or more first parent queries in the plurality of parent queries and each candidate sibling query for the particular child query is a child query for one or more second parent queries in the plurality of queries, each first parent query and each second parent query having a fan-out measure that satisfies a fan-out threshold, wherein the fan-out measure is a number of child queries associated with a particular parent query, wherein for each candidate sibling query, the one or more second parent queries for the candidate sibling query and the one or more first parent queries have a group of shared parent queries in common and the group of shared parent queries has a size that satisfies a common-query threshold; and
    selecting one or more final sibling queries for the particular child query from the one or more candidate sibling queries, and associating the final sibling queries with the particular child query as query refinements for the particular child query.

2. The method of claim 1, wherein each child query was submitted during a respective session following submission of its associated parent query during the session without any intervening queries submitted in the session.

3. The method of claim 1, wherein the group of one or more final siblings are selected according to a diversity between documents responsive to the final sibling queries.

4. The method of claim 1, wherein each child query for each parent query is submitted within an amount of time from when the parent query is submitted that satisfies a submission threshold.

5. The method of claim 1, wherein, for each child query, a user who submitted the child query selected a search result responsive to the child query after submitting the child query.

6. The method of claim 1, wherein each candidate sibling query has a fan-in measure that satisfies a fan-in threshold, wherein the fan-in measure for a particular sibling query is the number of parent queries that the particular sibling query is associated with.

7. The method of claim 1, wherein each candidate sibling query for the particular child query has a satisfactory strength of relationship to the particular child query, wherein the strength of relationship for a candidate sibling query is derived from a number of times the particular child query was submitted after each parent query in the group of shared parent queries for the particular child query was submitted and a number of times the candidate sibling query was submitted after each parent query in the group of shared parent queries for the particular child query and the candidate sibling query.

8. The method of claim 7, wherein a strength of relationship is satisfactory if the strength of relationship satisfies a relationship threshold.

9. The method of claim 1, wherein the common-query threshold has a first value when the candidate sibling query is a superstring of the particular child query, and a higher second value when the candidate sibling query is not a superstring of the particular child query.

10. The method of claim 1, wherein each first parent query is a high quality parent query for the particular child query, and each second parent query for a particular candidate sibling query is a high quality parent query for the particular sibling query.

11. The method of claim 10, wherein a high quality parent query has a high inverse document frequency in a corpus of documents.

12. The method of claim 10, wherein a high quality parent query for a given child query is not a superstring of the given child query.

13. A computer-implemented method, comprising:
    associating each of a plurality of parent queries with a respective group of one or more child queries for the parent query, wherein each child query was submitted in a respective session following submission of its associated parent query in the session, without any intervening queries submitted in the session;

identifying one or more candidate sibling queries for a particular child query, wherein the particular child query is a child query for one or more first parent queries in the plurality of parent queries and each candidate sibling query for the particular child query is a child query for one or more second parent queries in the plurality of queries, the one or more second parent queries for the candidate sibling query and the one or more first parent queries have a group of shared parent queries in common, the group of shared parent queries having a size that satisfies a common-query threshold; and selecting one or more final sibling queries for the particular child query from the one or more candidate sibling queries according to a diversity between documents responsive to the final sibling queries, and associating the final sibling queries with the particular child query as a query refinement for the particular child query.

14. The method of claim 13, wherein each child query was submitted during a respective session following submission of its associated parent query during the session without any intervening queries submitted in the session.

15. The method of claim 13, wherein each first parent query is a high quality parent query for the particular child query, and each second parent query for a particular candidate sibling query is a high quality parent query for the particular sibling query.

16. The method of claim 13, wherein each candidate sibling query for the particular child query has a satisfactory strength of relationship to the particular child query, wherein the strength of relationship for a candidate sibling query is derived from a number of times the particular child query was submitted after each parent query in the group of shared parent queries for the particular child query was submitted and a number of times the candidate sibling query was submitted after each parent query in the group of shared parent queries for the particular child query and the candidate sibling query.

17. The method of claim 13, wherein each first parent query and each second parent query has a fan-out measure that satisfies a fan-out threshold, where the fan-out measure for a particular parent query is the number of child queries associated with the particular parent query.

18. The method of claim 13, wherein each candidate sibling query has a fan-in measure that satisfies a fan-in threshold, wherein the fan-in measure for a particular sibling query is the number of parent queries that the particular sibling query is associated with.

19. The method of claim 13, wherein the candidate sibling queries are ordered according to an order, and selecting one or more final sibling queries for the particular child query from the one or more candidate sibling queries according to a diversity between documents responsive to the final sibling queries comprises:

processing one or more of the candidate sibling queries according to the order and determining, for at least one candidate sibling query, that the candidate sibling query has an intra-sibling diversity score satisfying a diversity threshold, the intra-sibling diversity score estimating diversity between a group of top documents responsive to the candidate sibling and a group of seen documents; and adding the candidate sibling query to the group of one or more final sibling queries; and adding the group of top documents to the group of seen documents.

20. The method of claim 19, wherein the group of seen documents comprises one or more top documents responsive to final sibling queries previously added to the group of final sibling queries.

21. A computer readable storage device having instructions stored thereon that, when executed by data processing apparatus, cause the data processing apparatus to perform operations comprising:

associating each of a plurality of parent queries with a respective group of one or more child queries for the parent query, wherein each child query was submitted during a respective session following submission of its associated parent query during the session;

identifying one or more candidate sibling queries for a particular child query, wherein the particular child query is a child query for one or more first parent queries in the plurality of parent queries and each candidate sibling query for the particular child query is a child query for one or more second parent queries in the plurality of queries, each first parent query and each second parent query having a fan-out measure that satisfies a fan-out threshold, wherein the fan-out measure is a number of child queries associated with a particular parent query, wherein for each candidate sibling query, the one or more second parent queries for the candidate sibling query and the one or more first parent queries have a group of shared parent queries in common and the group of shared parent queries has a size that satisfies a common-query threshold; and selecting one or more final sibling queries for the particular child query from the one or more candidate sibling queries, and associating the final sibling queries with the particular child query as query refinements for the particular child query.

22. The computer readable storage device of claim 21, wherein each child query was submitted during a respective session following submission of its associated parent query during the session without any intervening queries submitted in the session.

23. The computer readable storage device of claim 21, wherein the group of one or more final siblings are selected according to a diversity between documents responsive to the final sibling queries.

24. The computer readable storage device of claim 21, wherein each child query for each parent query is submitted within an amount of time from when the parent query is submitted that satisfies a submission threshold.

25. The computer readable storage device of claim 21, wherein, for each child query, a user who submitted the child query selected a search result responsive to the child query after submitting the child query.

26. The computer readable storage device of claim 21, wherein each candidate sibling query has a fan-in measure that satisfies a fan-in threshold, wherein the fan-in measure for a particular sibling query is the number of parent queries that the particular sibling query is associated with.

27. The computer readable storage device of claim 21, wherein each candidate sibling query for the particular child query has a satisfactory strength of relationship to the particular child query, wherein the strength of relationship for a candidate sibling query is derived from a number of times the particular child query was submitted after each parent query in the group of shared parent queries for the particular child query was submitted and a number of times the candidate sibling query was submitted after each parent query in the group of shared parent queries for the particular child query and the candidate sibling query.

28. The computer readable storage device of claim 27, wherein a strength of relationship is satisfactory if the strength of relationship satisfies a relationship threshold.

29. The computer readable storage device of claim 21, wherein the common-query threshold has a first value when the candidate sibling query is a superstring of the particular child query, and a higher second value when the candidate sibling query is not a superstring of the particular child query.

30. The computer readable storage device of claim 21, wherein each first parent query is a high quality parent query for the particular child query, and each second parent query for a particular candidate sibling query is a high quality parent query for the particular sibling query.

31. The computer readable storage device of claim 30, wherein a high quality parent query has a high inverse document frequency in a corpus of documents.

32. The computer readable storage device of claim 30, wherein a high quality parent query for a given child query is not a superstring of the given child query.

33. A computer readable storage device having instructions stored thereon that, when executed by data processing apparatus, cause the data processing apparatus to perform operations comprising:
associating each of a plurality of parent queries with a respective group of one or more child queries for the parent query, wherein each child query was submitted in a respective session following submission of its associated parent query in the session;
identifying one or more candidate sibling queries for a particular child query, wherein the particular child query is a child query for one or more first parent queries in the plurality of parent queries and each candidate sibling query for the particular child query is a child query for one or more second parent queries in the plurality of queries, the one or more second parent queries for the candidate sibling query and the one or more first parent queries have a group of shared parent queries in common, the group of shared parent queries having a size that satisfies a common-query threshold; and
selecting one or more final sibling queries for the particular child query from the one or more candidate sibling queries according to a diversity between documents responsive to the final sibling queries, and associating the final sibling queries with the particular child query as a query refinement for the particular child query.

34. The computer readable storage device of claim 33, wherein each child query was submitted during a respective session following submission of its associated parent query during the session without any intervening queries submitted in the session.

35. The computer readable storage device of claim 33, wherein each first parent query is a high quality parent query for the particular child query, and each second parent query for a particular candidate sibling query is a high quality parent query for the particular sibling query.

36. The computer readable storage device of claim 33, wherein each candidate sibling query for the particular child query has a satisfactory strength of relationship to the particular child query, wherein the strength of relationship for a candidate sibling query is derived from a number of times the particular child query was submitted after each parent query in the group of shared parent queries for the particular child query was submitted and a number of times the candidate sibling query was submitted after each parent query in the group of shared parent queries for the particular child query and the candidate sibling query.

37. The computer readable storage device of claim 33, wherein each first parent query and each second parent query has a fan-out measure that satisfies a fan-out threshold, where the fan-out measure for a particular parent query is the number of child queries associated with the particular parent query.

38. The computer readable storage device of claim 33, wherein each candidate sibling query has a fan-in measure that satisfies a fan-in threshold, wherein the fan-in measure for a particular sibling query is the number of parent queries that the particular sibling query is associated with.

39. The computer readable storage device of claim 33, wherein the candidate sibling queries are ordered according to an order, and selecting one or more final sibling queries for the particular child query from the one or more candidate sibling queries according to a diversity between documents responsive to the final sibling queries comprises:
processing one or more of the candidate sibling queries according to the order and determining, for at least one candidate sibling query, that the candidate sibling query has an intra-sibling diversity score satisfying a diversity threshold, the intra-sibling diversity score estimating diversity between a group of top documents responsive to the candidate sibling and a group of seen documents; and
adding the candidate sibling query to the group of one or more final sibling queries; and
adding the group of top documents to the group of seen documents.

40. The computer readable storage device of claim 39, wherein the group of seen documents comprises one or more top documents responsive to final sibling queries previously added to the group of final sibling queries.

41. A system comprising:
one or more computers programmed to perform operations comprising:
associating each of a plurality of parent queries with a respective group of one or more child queries for the parent query, wherein each child query was submitted during a respective session following submission of its associated parent query during the session;
identifying one or more candidate sibling queries for a particular child query, wherein the particular child query is a child query for one or more first parent queries in the plurality of parent queries and each candidate sibling query for the particular child query is a child query for one or more second parent queries in the plurality of queries, each first parent query and each second parent query having a fan-out measure that satisfies a fan-out threshold, wherein the fan-out measure is a number of child queries associated with a particular parent query, wherein for each candidate sibling query, the one or more second parent queries for the candidate sibling query and the one or more first parent queries have a group of shared parent queries in common and the group of shared parent queries has a size that satisfies a common-query threshold; and
selecting one or more final sibling queries for the particular child query from the one or more candidate sibling queries, and associating the final sibling queries with the particular child query as query refinements for the particular child query.

42. The system of claim 41, wherein each child query was submitted during a respective session following submission of its associated parent query during the session without any intervening queries submitted in the session.

43. The system of claim 41, wherein the group of one or more final siblings are selected according to a diversity between documents responsive to the final sibling queries.

44. The system of claim 41, wherein each child query for each parent query is submitted within an amount of time from when the parent query is submitted that satisfies a submission threshold.

45. The system of claim 41, wherein, for each child query, a user who submitted the child query selected a search result responsive to the child query after submitting the child query.

46. The system of claim 41, wherein each candidate sibling query has a fan-in measure that satisfies a fan-in threshold, wherein the fan-in measure for a particular sibling query is the number of parent queries that the particular sibling query is associated with.

47. The system of claim 41, wherein each candidate sibling query for the particular child query has a satisfactory strength of relationship to the particular child query, wherein the strength of relationship for a candidate sibling query is derived from a number of times the particular child query was submitted after each parent query in the group of shared parent queries for the particular child query was submitted and a number of times the candidate sibling query was submitted after each parent query in the group of shared parent queries for the particular child query and the candidate sibling query.

48. The system of claim 47, wherein a strength of relationship is satisfactory if the strength of relationship satisfies a relationship threshold.

49. The system of claim 41, wherein the common-query threshold has a first value when the candidate sibling query is a superstring of the particular child query, and a higher second value when the candidate sibling query is not a superstring of the particular child query.

50. The system of claim 41, wherein each first parent query is a high quality parent query for the particular child query, and each second parent query for a particular candidate sibling query is a high quality parent query for the particular sibling query.

51. The system of claim 50, wherein a high quality parent query has a high inverse document frequency in a corpus of documents.

52. The system of claim 50, wherein a high quality parent query for a given child query is not a superstring of the given child query.

53. A system comprising:
one or more computers programmed to perform operations comprising:
associating each of a plurality of parent queries with a respective group of one or more child queries for the parent query, wherein each child query was submitted in a respective session following submission of its associated parent query in the session;
identifying one or more candidate sibling queries for a particular child query, wherein the particular child query is a child query for one or more first parent queries in the plurality of parent queries and each candidate sibling query for the particular child query is a child query for one or more second parent queries in the plurality of queries, the one or more second parent queries for the candidate sibling query and the one or more first parent queries have a group of shared parent queries in common, the group of shared parent queries having a size that satisfies a common-query threshold; and
selecting one or more final sibling queries for the particular child query from the one or more candidate sibling queries according to a diversity between documents responsive to the final sibling queries, and associating the final sibling queries with the particular child query as a query refinement for the particular child query.

54. The system of claim 53, wherein each child query was submitted during a respective session following submission of its associated parent query during the session without any intervening queries submitted in the session.

55. The system of claim 53, wherein each first parent query is a high quality parent query for the particular child query, and each second parent query for a particular candidate sibling query is a high quality parent query for the particular sibling query.

56. The system of claim 53, wherein each candidate sibling query for the particular child query has a satisfactory strength of relationship to the particular child query, wherein the strength of relationship for a candidate sibling query is derived from a number of times the particular child query was submitted after each parent query in the group of shared parent queries for the particular child query was submitted and a number of times the candidate sibling query was submitted after each parent query in the group of shared parent queries for the particular child query and the candidate sibling query.

57. The system of claim 53, wherein each first parent query and each second parent query has a fan-out measure that satisfies a fan-out threshold, where the fan-out measure for a particular parent query is the number of child queries associated with the particular parent query.

58. The system of claim 53, wherein each candidate sibling query has a fan-in measure that satisfies a fan-in threshold, wherein the fan-in measure for a particular sibling query is the number of parent queries that the particular sibling query is associated with.

59. The system of claim 53, wherein the candidate sibling queries are ordered according to an order, and selecting one or more final sibling queries for the particular child query from the one or more candidate sibling queries according to a diversity between documents responsive to the final sibling queries comprises:
processing one or more of the candidate sibling queries according to the order and determining, for at least one candidate sibling query, that the candidate sibling query has an intra-sibling diversity score satisfying a diversity threshold, the intra-sibling diversity score estimating diversity between a group of top documents responsive to the candidate sibling and a group of seen documents; and
adding the candidate sibling query to the group of one or more final sibling queries; and
adding the group of top documents to the group of seen documents.

60. The system of claim 59, wherein the group of seen documents comprises one or more top documents responsive to final sibling queries previously added to the group of final sibling queries.

* * * * *